(12) United States Patent
Shin et al.

(10) Patent No.: US 9,986,170 B2
(45) Date of Patent: May 29, 2018

(54) METHOD AND APPARATUS FOR SENSING SPATIAL INFORMATION BASED ON VISION SENSOR

(71) Applicant: SAMSUNG ELECTRONICS CO., LTD., Suwon-si (KR)

(72) Inventors: Chang-Woo Shin, Hwaseong-si (KR); Keun Joo Park, Seoul (KR); Jooyeon Woo, Seoul (KR); Kyoobin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 14/101,841

(22) Filed: Dec. 10, 2013

(65) Prior Publication Data

US 2014/0320706 A1 Oct. 30, 2014

(30) Foreign Application Priority Data

Apr. 30, 2013 (KR) .................. 10-2013-0048802

(51) Int. Cl.
*H04N 5/235* (2006.01)
*H04N 9/04* (2006.01)

(52) U.S. Cl.
CPC ......... *H04N 5/2353* (2013.01); *H04N 5/2354* (2013.01); *H04N 9/045* (2013.01)

(58) Field of Classification Search
CPC .... H04N 5/2353; H04N 5/2354; H04N 9/045; H04N 3/1587
See application file for complete search history.

(56) References Cited

U.S. PATENT DOCUMENTS

| 7,728,269 | B2 | 6/2010 | Lichtsteiner et al. |
| 2002/0030150 | A1* | 3/2002 | Landolt .................. 250/208.1 |
| 2004/0008410 | A1* | 1/2004 | Stam .................... B60R 1/062 |
| | | | 359/443 |
| 2008/0062285 | A1* | 3/2008 | Xie .................. H04N 5/23248 |
| | | | 348/240.1 |
| 2008/0135731 | A1 | 6/2008 | Lichtsteiner et al. |
| 2009/0027518 | A1* | 1/2009 | Kita ...................... 348/231.99 |
| 2011/0090377 | A1* | 4/2011 | Smith ................ G06K 9/2054 |
| | | | 348/241 |

(Continued)

FOREIGN PATENT DOCUMENTS

| CN | 101706225 B | 6/2011 |
| JP | 6-102026 | 4/1994 |

(Continued)

OTHER PUBLICATIONS

Extended European Search Report dated Aug. 29, 2014 in counterpart European Patent Application No. 14157683.5 (9 pages, in English).

(Continued)

*Primary Examiner* — Dennis Hogue
(74) *Attorney, Agent, or Firm* — NSIP Law

(57) ABSTRACT

Apparatuses and methods for sensing spatial information based on a vision sensor are disclosed. The apparatus and method recognize the spatial information of an object sensed by the vision sensor that senses a temporal change of light. The light being input into the vision sensor is artificially changed using a change unit configured to change the light being input to the vision sensor.

24 Claims, 6 Drawing Sheets

(56) References Cited

U.S. PATENT DOCUMENTS

2013/0100254 A1*  4/2013  Morioka et al. ................ 348/47

FOREIGN PATENT DOCUMENTS

| | | |
|---|---|---|
| JP | 2008-216098 | 9/2008 |
| JP | 2009-133749 | 6/2009 |
| JP | 2009-257774 A | 11/2009 |
| JP | 2012-2735 | 1/2012 |
| JP | 2012-112923 | 6/2012 |
| KR | 10-2008-0091089 | 10/2008 |
| KR | 10-2011-0010300 | 2/2011 |

OTHER PUBLICATIONS

Posch, Christoph. "Bio-inspired vision." Journal of Instrumentation 7.01, IOP Publishing Ltd and SISSA (Jan. 12, 2012): 14 pages.

Serrano-Gotarredona, Rafael, et al. "CAVIAR: A 45k Neuron, 5M Synapse, 12G Connects/s AER Hardware Sensory—Processing—Learning—Actuating System for High-Speed Visual Object Recognition and Tracking." IEEE Transactions on Neural Networks vol. 20. No. 9 (Sep. 9, 2009) pp. 1417-1438.

Delbruck, Tobi. "Fun with Asynchronous Vision Sensors and Processing." ECCV 2012 Workshops and Demonstrations Part I. LNCS 7583 Springer-Verlag Berlin Heidelberg, (2012). pp. 506-515.

* cited by examiner

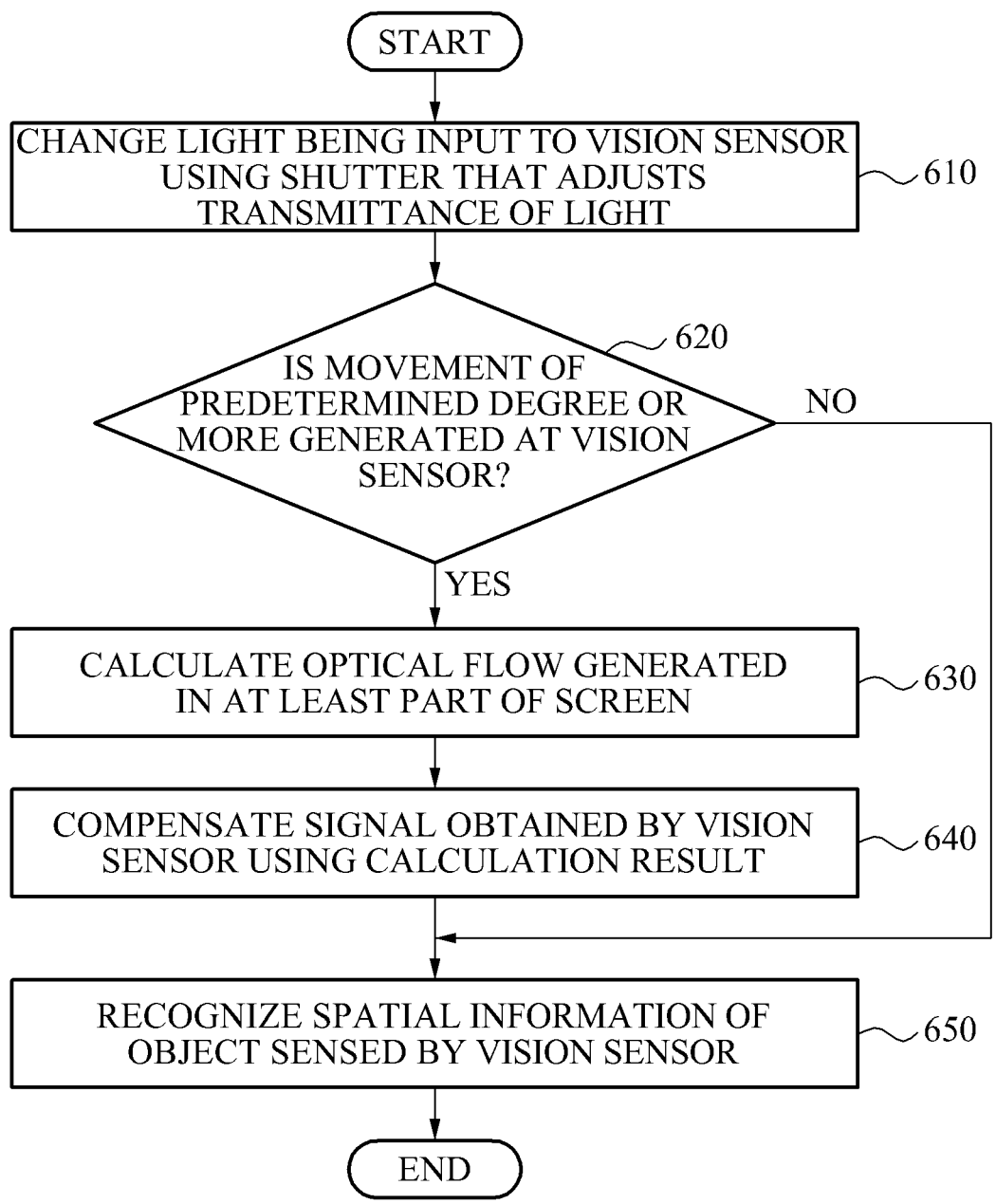

METHOD AND APPARATUS FOR SENSING SPATIAL INFORMATION BASED ON VISION SENSOR

CROSS-REFERENCE TO RELATED APPLICATIONS

This application claims the benefit under 35 USC § 119(a) of Korean Patent Application No. 10-2013-0048802, filed on Apr. 30, 2013, in the Korean Intellectual Property Office, the entire disclosure of which is incorporated herein by reference for all purposes.

BACKGROUND

1. Field

The following description relates to an apparatus and method for sensing spatial information based on a vision sensor.

2. Description of Related Art

A vision sensor is a device that senses input data for image processing. For example, the vision sensor includes a photoelectric conversion device in the form of an integrated circuit based on a semiconductor manufacturing technology, such as a complementary metal oxide semiconductor (CMOS) sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for sensing spatial information of an object, the apparatus including a vision sensor configured to sense a temporal change of light; and a changer configured to change light being input to the vision sensor, wherein the spatial information of the object is sensed by the vision sensor based on light artificially changed by the changer.

The changer may include an actuator configured to apply a movement to the vision sensor.

The changer may be configured to adjust an output of the vision sensor by adjusting a movement of the actuator.

The changer may calculate a spatial differential value of light generated from the object by a movement generated at the vision sensor when the movement is generated by the actuator.

The changer may comprise a shutter configured to adjust a transmittance of the light.

The apparatus may include at least one color filter configured to change transmittance according to a wavelength band of the light being input to the vision sensor, wherein a color image is obtained by sequentially combining operational results of the shutter with respect to the at least one color filter.

The changer may further include a shutter configured to adjust a transmittance of the light, wherein the apparatus alternately senses information on a change of the light being input to the vision sensor and the spatial information of the object by controlling operation of the actuator or the shutter.

The apparatus may include a second vision sensor configured to sense a temporal change of the light; and a second changer configured to change light being input to the second vision sensor.

The apparatus may include an obtainer configured to obtain output values from the vision sensor and the second vision sensor; a calculator configured to calculate disparity of spatial information recognized from the vision sensor and the second vision sensor; and an extractor configured to extract 3-dimensional (3D) spatial information using the disparity of the spatial information.

The changer may be configured to change light being input to the vision sensor by adjusting at least one of a minimum value of transmittance, a maximum value of transmittance, a maintaining time of transmittance, a change period of the light, or a change speed of the light.

The spatial information may include at least one of a position, a distance, a shape, a size, a color of the object, or the background present in a space.

In another general aspect, there is provided an apparatus for the apparatus including a vision sensor configured to sense a temporal change of light; and a compensator configured to compensate a signal generated by a movement of the vision sensor from a signal obtained by the vision sensor.

The compensator may compensate the signal by measuring an optical flow generated from at least a part of a screen due to the movement of the vision sensor and using a difference of the optical flow between pixels of the vision sensor.

The apparatus may include an inertia sensor configured to sense the movement generated at the vision sensor.

The compensator may be configured to compensate the signal obtained from the vision sensor using a signal obtained from the inertia sensor when the movement is generated at the vision sensor.

The apparatus may include a mover configured to change movement information of the vision sensor, the movement information comprising at least one of a position, a direction, or a zoom state, wherein the compensator is configured to calculate a signal generated by the movement of the vision sensor using the movement information of the mover, and to compensate the signal obtained from the vision sensor using the calculation result.

The apparatus may include a reliability extractor configured to extract reliability with respect to the signal obtained from the vision sensor or the signal compensated by the compensator.

The compensator may be configured to selectively compensate the signal obtained by the vision sensor when the movement of the vision sensor is greater than or equal to a predetermined threshold value.

In another general aspect, there is provided a method of sensing spatial information of an object, the method including changing light being input to a vision sensor that is configured to sense a temporal change of light; and recognizing spatial information of the object sensed by the vision sensor.

The changing of the light being input may include changing the light being input to the vision sensor using an actuator that is configured to apply a movement to the vision sensor.

The changing of the light being input may include adjusting an output of the vision sensor by adjusting a degree of the movement of the actuator.

The changing of the light being input may include calculating a spatial differential value of light generated from the object due to a movement generated by the actuator at the vision sensor.

The changing of the light being input may include adjusting a transmittance of the light being input to the vision sensor using a shutter that is configured to generate an output proportional to brightness of the light.

The method may include mounting at least one color filter configured to change transmittance according to a wavelength band of the light being input to the vision sensor; and obtaining a color image by sequentially combining operational results of the shutter with respect to the at least one color filter.

The changing of the light may comprise adjusting a transmittance of the light being input to the vision sensor using a shutter that generates an output proportional to brightness of the light, and the recognizing of the spatial information may comprise alternately sensing information on a change of the light being input to the vision sensor and the spatial information of the object by controlling operation of the actuator or the shutter.

The method may include sensing a temporal change of the light using a second vision sensor; and changing light being input to the second vision sensor using a second changer.

The method may include obtaining output values from the vision sensor and the second vision sensor by the changed light; calculating disparity of spatial information recognized from the vision sensor and the second vision sensor using the output values; and extracting 3-dimensional (3D) spatial information using the disparity of the spatial information.

In another general aspect, there is provided a method of sensing spatial information based on a vision sensor, the method including sensing a movement of a vision sensor that senses a temporal change of light; and compensating a signal generated by the movement of the vision sensor from a signal obtained by the vision sensor.

The compensating may comprise measuring an optical flow generated from at least a part of a screen due to the movement of the vision sensor; and compensating a signal obtained from the vision sensor using a result of the measurement and a difference of the optical flow between pixels of the vision sensor.

The compensating may comprise sensing a movement generated at the vision sensor using an inertia sensor; and compensating the signal obtained from the vision sensor using a signal obtained from the inertia sensor.

The method may include changing at least one movement information selected from a position, a direction, or a zoom state of the vision sensor; calculating a signal generated by the movement of the vision sensor using the changed movement information; and compensating the signal obtained from the vision sensor using the calculation result.

The method may include extracting reliability with respect to the signal obtained from the vision sensor or the signal compensated from the signal of the vision sensor.

Other features and aspects will be apparent from the following detailed description, the drawings, and the claims.

BRIEF DESCRIPTION OF THE DRAWINGS

FIG. 6 is a diagram illustrating another example of a method of sensing spatial information based on a vision sensor.

Figure 1:
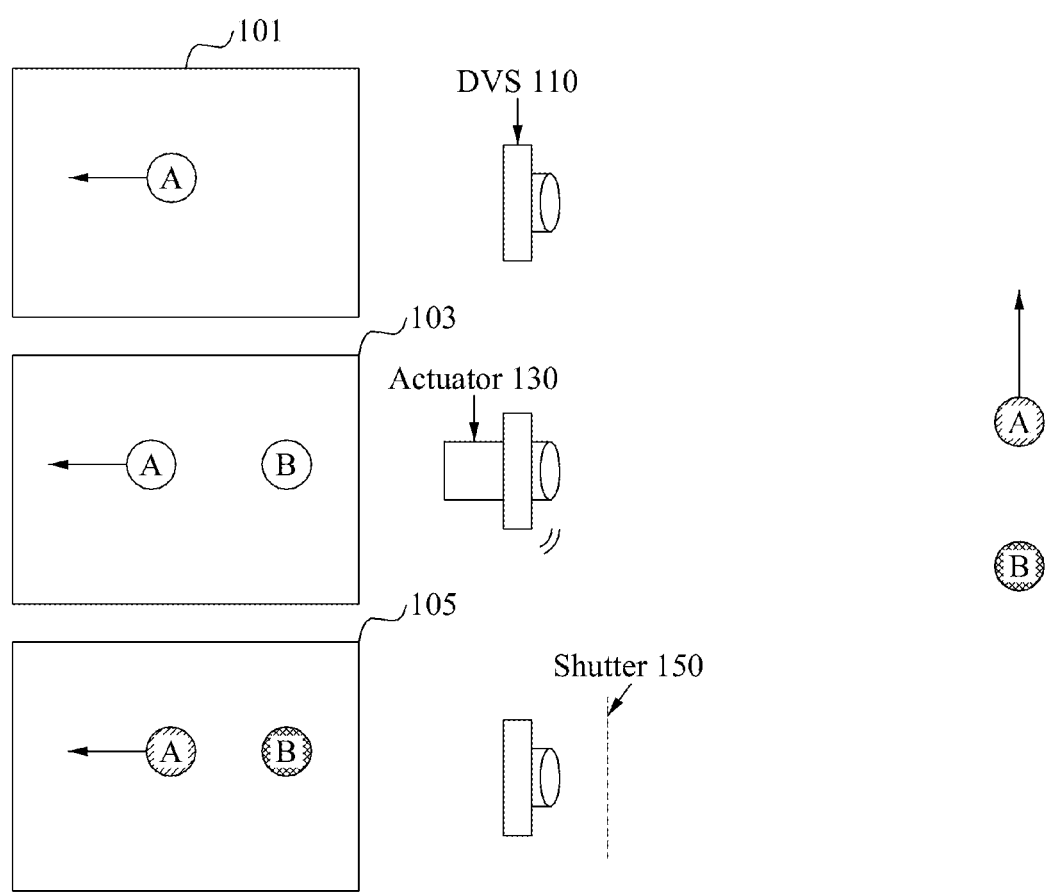
FIG. 1 is a diagram illustrating examples of various configurations and operations of an apparatus for sensing spatial information based on a vision sensor.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates examples of various configurations and operations of an apparatus for sensing spatial information based on a vision sensor. Referring to FIG. 1, the apparatus for sensing spatial information based on a vision sensor, which may be referred to as a 'sensing apparatus,' may include a vision sensor 110, an actuator 130, and a shutter 150.

The vision sensor 110 may sense a temporal change of light with respect to an object, i.e., a temporal differential value of light. When the object moves, the vision sensor 110 may sense a movement of the object against a background by sensing the temporal change of light with respect to the object. For example, a dynamic vision sensor (DVS) that senses a change of light intensity in each pixel may implement the vision sensor 110. When at least two vision sensors 110 sense the temporal change of light with respect to the object or an entire space, 3-dimensional (3D) spatial information with respect to the object or the entire space may be obtained.

When the DVS is used as the vision sensor 110, as shown in 101, the vision sensor 110 may sense spatial information of a moving object A by the change of light intensity with respect to the moving object A. Conversely, with respect to an stationary object B, which does not move, the vision sensor 110 may not be able to sense spatial information of the stationary object B.

In a non-exhaustive example, the vision sensor 110 may recognize the spatial information of the stationary object B by sensing a spatial differential value of light or brightness information of light by artificially changing input light.

When the vision sensor 110 is able to recognize the spatial information of the stationary object B, the sensing apparatus may extract spatial information not only on the object but also on a background.

The spatial information may include, but is not limited to, at least one of a position, a distance, a shape, a size, a color of the object and the background present in a space.

According to a non-exhaustive example, a movement may be artificially applied to the vision sensor 110 using the actuator 130, thereby enabling the vision sensor 110 to sense the spatial differential value of light for the object. According to another example, transmittance of the light being input to the vision sensor 110 may be artificially changed by the shutter 150, so that the vision sensor 110 may generate an output proportional to brightness of the light of the object. Artificially changing the transmittance of the input light using the shutter 150 will be described later.

The actuator 130 may apply the movement to the vision sensor 110 to change the light being input to the vision sensor 110. For example, the sensing apparatus may adjust the output of the vision sensor 110 by adjusting a degree of the movement such as, for example, a direction, a period, an intensity of the movement of the actuator 130.

When the movement is generated at the vision sensor 110 by the actuator 130, the sensing apparatus may calculate the spatial differential value of the light generated at the object. For example, the spatial differential value of the light generated at the object may correspond to an outline or an edge of the object.

Therefore, when the sensing apparatus includes the vision sensor 110 and the actuator 130, the sensing apparatus may recognize the spatial information with respect to both the moving object A and the stationary object B as shown in 103.

In another example, the sensing apparatus may include the vision sensor 110 and the shutter 150. The shutter 150 may be a mechanical shutter, or other type of shutter such as, for example, a liquid crystal display (LCD) shutter.

The shutter 150 may generate the output proportional to the brightness of the light by adjusting a transmittance of the light being input to the vision sensor 110. For example, when the transmittance of the light being input to the vision sensor 110 is changed using the shutter 150, the output may be generated in proportion to brightness of the object sensed by the vision sensor 110.

Thus, when the shutter 150 or an iris (not shown) is provided in front of the vision sensor 110, the intensity of the light being input to the vision sensor 110 may be changed. When the intensity of the light being input to the vision sensor 110 is changed, an output proportional to the brightness may be generated from individual pixels of the vision sensor 110.

When the light intensity is changed at time intervals, the sensing apparatus may alternately perform motion recognition and shape recognition. Also, the sensing apparatus may alternately sense information on a change of the light being input to the vision sensor 110 and the spatial information of the object by controlling the on and off operation of the actuator 130 or the shutter 150. For example, the sensing apparatus may sense the spatial information by generating the movement such as oscillation by operating the actuator 130, or sense the information on the change of the light by operating the shutter 150 without operating the actuator 130, thus alternately sensing the spatial information and the information on the change of the light.

The vision sensor 110, for example the DVS, senses only a change of light and therefore may not sense a shape and a color of the object or the background. In an alternate example, the shutter 150 or a color filter (not shown) may be provided in front of the vision sensor 110 to obtain brightness or a color of the light.

The sensing apparatus may obtain brightness information of the light by sensing a difference between a light present state and a light absent state using the shutter. The 'light absent state' may be understood to include both a state in which light is totally absent or and a state in which light is almost absent.

The sensing apparatus may adjust at least one of a minimum value, a maximum value, and a temporal pattern of light transmission. The temporal pattern being a change period and a change speed of the transmittance of the light being input to the vision sensor 110 using the shutter 150.

The sensing apparatus may further include at least one color filter (not shown) that varies the transmittance according to a wavelength band of the light being input to the vision sensor 110. For example, when the sensing apparatus includes the vision sensor 110, the shutter 150, and the color filter (not shown), the sensing apparatus may obtain red (R), green (G), and blue (B) brightness information by operating the shutter 150 with the R, G, and B color filters, sequentially. In addition, as shown in 105, the sensing apparatus may obtain or reconstruct a color image with respect to both the moving object A and the stationary object B by combining the brightness information.

For example, the sensing apparatus may extract color information by synchronizing a time point at which the light is transmitted through the shutter, that is, an operation time point of the shutter 150, with the output of the vision sensor 110.

The instance where the sensing apparatus operates the shutter 150 sequentially with respect to the color filters may be illustrated with reference to FIG. 2.

Figure 2:
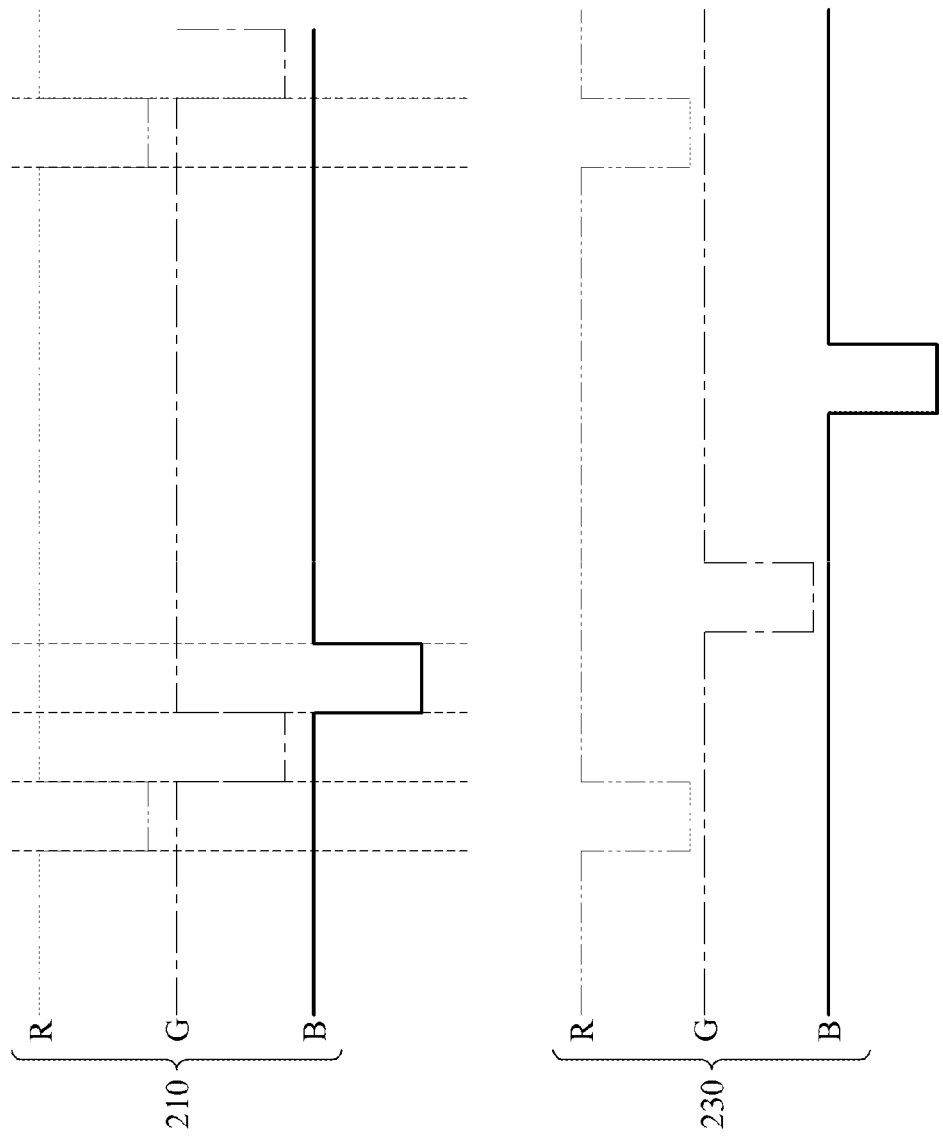
FIG. 2 is a diagram illustrating an example of an apparatus for sensing spatial information based on a vision sensor, the apparatus sequentially operating a shutter with respect to one color filter.

FIG. 2 illustrates an example of an apparatus for sensing spatial information based on a vision sensor, the apparatus sequentially operates a shutter with respect to one color filter. Referring to FIG. 2, the sensing apparatus may apply three color filters, that is, an R, G, and B color filters, sequentially. As shown in 210, a color image may be obtained by combining the results of applying the color filters.

To sequentially apply the three color filters, the sensing apparatus may transmit or interrupt light with respect to only one of the three color filters using the shutter 150. In another example, the sensing apparatus may arrange the three color filters such that the three color filters are sequentially disposed in front of the vision sensor. In yet another example, the sensing apparatus may apply the shutter 150 to the color filters separately.

According to the non-exhaustive example, as shown in 230, after sensing the spatial information according to brightness information with respect to the R color filter the sensing apparatus may sense the spatial information according to brightness information with respect to the G color filter. The sensing apparatus may then sense the spatial information according to brightness information with respect to the B color filter.

Figure 3:
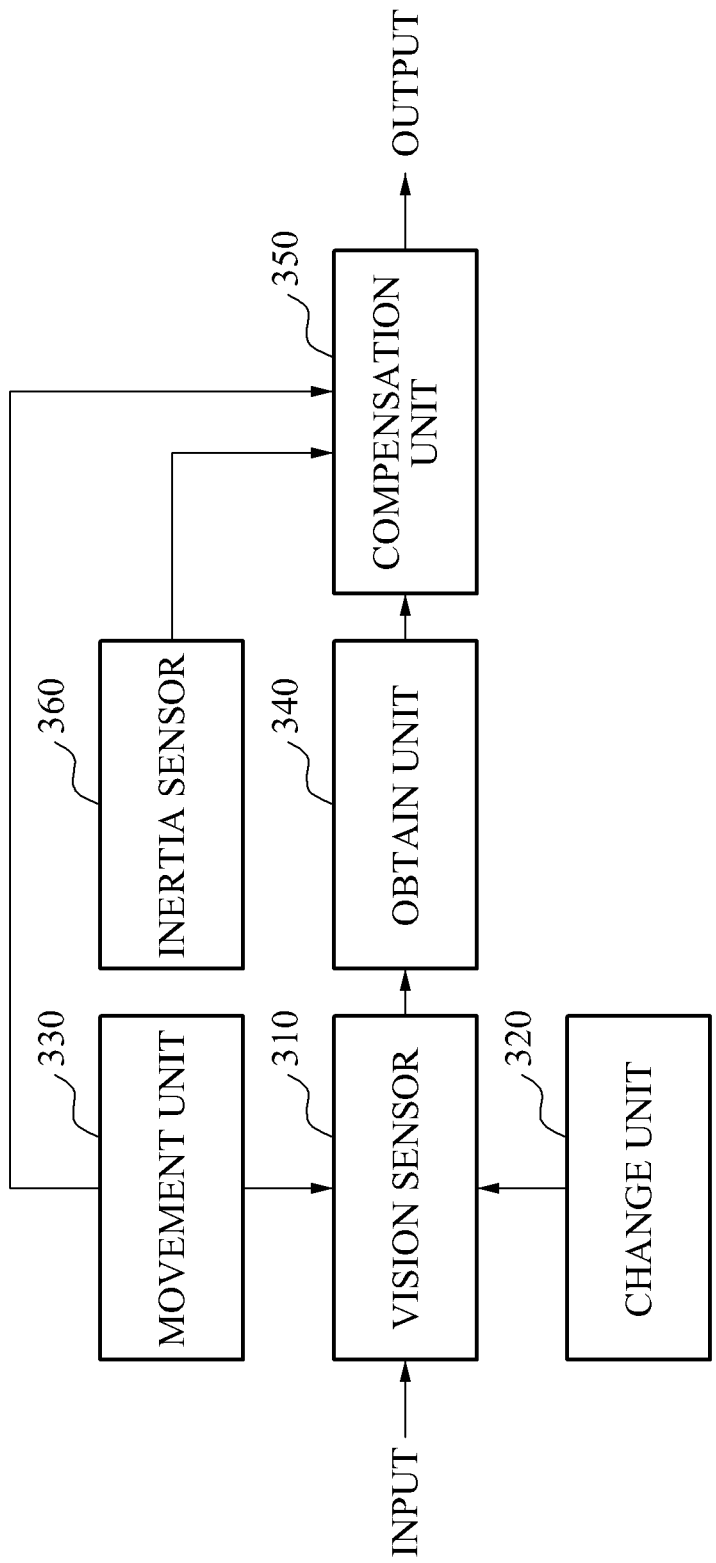
FIG. 3 is a diagram illustrating an example of an apparatus for sensing spatial information based on a vision sensor.

FIG. 3 illustrates an example of an apparatus for sensing spatial information based on a vision sensor. Referring to FIG. 3, the sensing apparatus may include a vision sensor 310, a change unit 320, a movement unit 330, an obtain unit 340, a compensation unit 350, and an inertia sensor 360. The vision sensor 310 may sense a temporal change of light. FIG. 1 may be referenced for a detailed description about the vision sensor 310 and the change unit 320.

The change unit 320 may apply a movement, such as, for example, in the form of oscillation to the vision sensor 310 to change the light. The change unit 320 may change the light being input to the vision sensor 310 by adjusting an intensity, a direction, or a period of the movement applied to the vision sensor 310. The change unit 320 may adjust an output of the vision sensor 310 by adjusting a movement of the actuator that applies the movement to the vision sensor 310 to change the light being input to the vision sensor 310. The change unit 320 may enable the vision sensor 310 to sense a spatial differential value of the light generated from an object through the movement of the actuator. The change unit 320 may further include a shutter or a color filter in addition to the actuator. The change unit 320 may change the light being input to the vision sensor 310 by changing intensity of the light. For example, the change unit 320 may change the light being input to the vision sensor, by adjusting a minimum value, a maximum value, a maintaining time, a change period, and a change speed of transmittance of the light, using the shutter.

The obtain unit 340 may obtain at least one information on a change of the object and the spatial information from the output of the vision sensor 310. In a non-exhaustive example, the output of the vision sensor 310 may be proportional to the change of the object, such as the movement, when the change unit 320 is not operating. In another example, the output of the vision sensor 310 may be proportional to the spatial differential value or brightness of the light according to the operation of the change unit 320. A method of obtaining the spatial information of the object from the output of the vision sensor 310 by the obtain unit 340 will be described in detail with reference to FIG. 4.

The movement unit 330 may move the vision sensor 310 to change the position, the direction, or the zoom state of the vision sensor 310. When the movement of the object or the spatial information is extracted using the vision sensor 310, an optical flow of a particular direction may be generated in an entire screen based on the movement direction of the vision sensor 310. This may happen when the vision sensor 310 itself is moved due to the operation of the movement unit 330 or other factors. Such other factors may include, but are not limited to, an external force, shake of a device, or vibration of a car. Therefore, the optical flow of the particular direction may be compensated so that desired movement information of the object may be extracted.

The optical flow caused by the movement of the vision sensor 310 may be obtained by measuring the optical flow generated in a background or the entire screen and using a difference of the optical flow between pixels.

When the movement of the vision sensor 310 is generated, the compensation unit 350 may compensate a signal generated by the movement from a signal obtained by the vision sensor 310. To compensate the signals obtained from vision sensor 310, the compensation unit 350 may measure an optical flow generated from at least a part of the screen by the movement of the vision sensor 310 and use a difference of the optical flow between pixels of the vision sensors 310.

The compensation unit 350 may predict or calculate the optical flow using movement information of the movement unit 330. Also, the compensation unit 350 may compensate the signals obtained from the vision sensor 310 by calculating a signal generated by the movement of the vision sensor 310 and using the calculation result.

The term 'optical flow' may be defined as velocity distribution of an apparent movement in an image. The movement may be generated by gradually changing a flow of light or a brightness type perceived by an eye of an observer in an environment where a relative movement is present between the observer and the screen.

In addition, the optical flow may also be obtained by calculating information about the movement of the vision sensor 310 using the inertia sensor 360. A gyro sensor may be used as the inertia sensor 360.

When the movement of the vision sensor 310 is generated by the movement unit 330, for example, an actuator, the compensation unit 350 may compensate a signal obtained from the inertia sensor 350 by using the calculation result. The compensation unit 350 may selectively compensate the signal obtained by the vision sensor 310 only when the movement of the vision sensor 310 is greater than or equal to a predetermined threshold value. Thus, the compensation unit 350 may compensate the signal generated by the movement of the vision sensor 310 to improve a movement sensing function of the vision sensor 310 or to obtain the spatial information.

The compensation unit 350 may sense the movement generated at the vision sensor 310 using the inertia sensor 360 or it may predict or calculate the optical flow using the sensed information.

The compensation unit 350 may compensate the signal generated by an unintended movement of the vision sensor 310, by using at least one of the movement information obtained by the vision sensor 310, the information sensed by the inertia sensor 360, the movement information of the movement unit 330, or by obtaining the optical flow of the entire screen or part of the screen and using a difference of the optical flow between portions of the screen.

In a non-exhaustive example, the sensing apparatus may further include a reliability extraction unit (not shown) configured to extract reliability with respect to the spatial information of the object, i.e., the reliability of the signal obtained from the vision sensor 310, corresponding to the movement of the vision sensor 310 or the signal compensated by the compensation unit 350. For example when the movement of the vision sensor 310 is too significant or hard to compensate, the sensing apparatus may obtain reliability in movement sensing with respect to the object by the reliability extract unit (not shown), thereby preventing faulty operation of the sensing apparatus.

Figure 4:
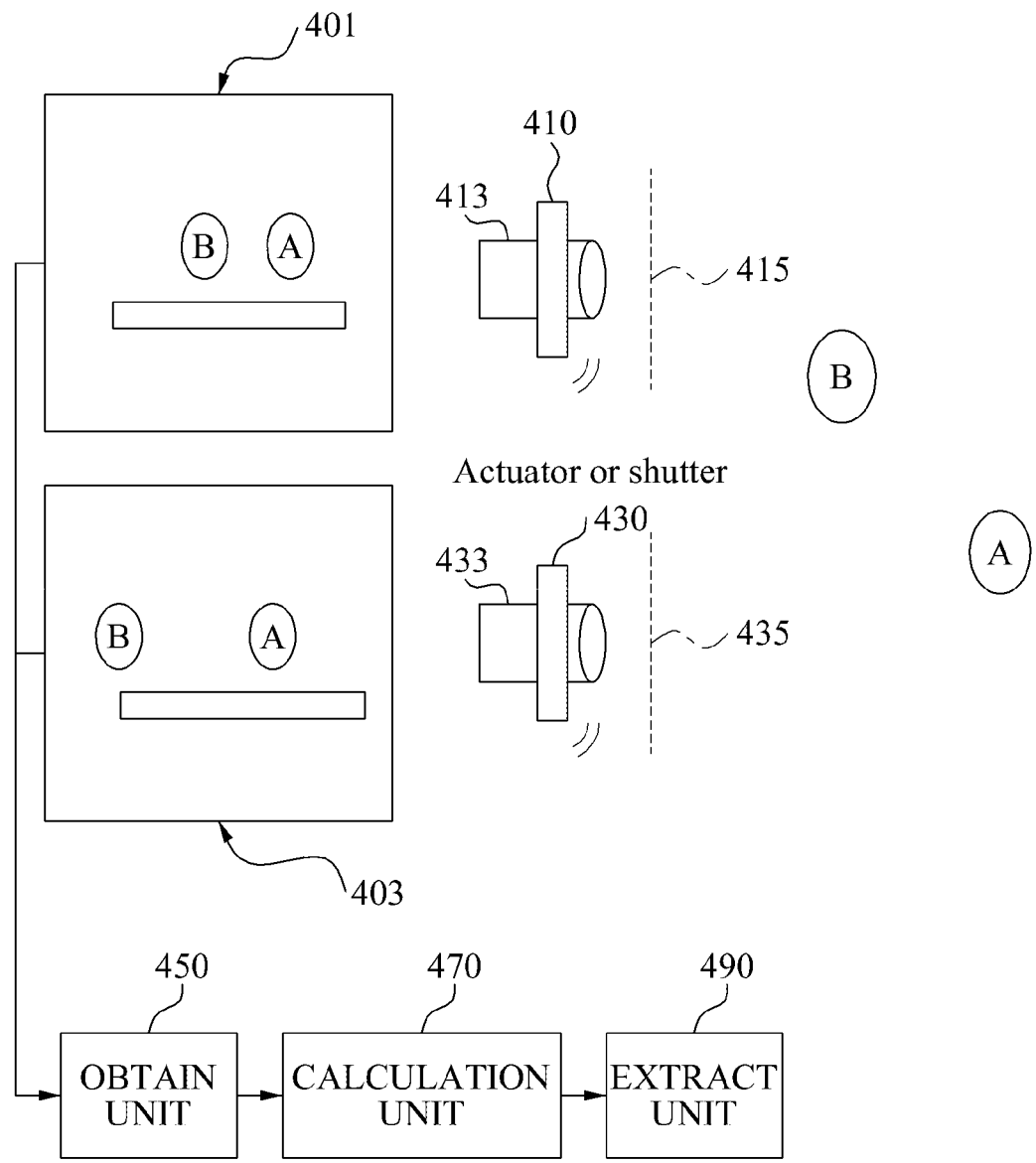
FIG. 4 is a diagram illustrating an example configuration of an apparatus for sensing spatial information based on a vision sensor, the apparatus including a plurality of vision sensors and a plurality of change units.

FIG. 4 is a diagram illustrating an example configuration of an apparatus for sensing spatial information based on a vision sensor, the apparatus includes a plurality of vision sensors and a plurality of change units. Referring to FIG. 4, the sensing apparatus according to the non-exhaustive example may include a first vision sensor 410 with a first actuator 413 or first shutter 415, a second vision sensor 430 with a second actuator 433 or second shutter 435, an obtain unit 450, a calculation unit 470, and an extract unit 490. The first actuator 413 or the first shutter 415 may be referred to as a first change unit and the second actuator 433 or the second shutter 435 may be referred to as a second change unit.

According to the non-exhaustive example, 3D spatial information may be obtained with respect to an entire space using at least two vision sensors, vision sensors 410 and 430. The first vision sensor 410 and the second vision sensor 430 may sense a temporal change of light. The first change unit and the second change unit may artificially change the light being input to the vision sensors 410 and 430, respectively.

The vision sensors, the actuators, and the shutters are described with reference to FIGS. 1 to 3. The description of FIGS. 1-3 is also applicable to FIG. 4, and thus will not be repeated here.

The obtain unit 450 may obtain output values of the first vision sensor 410 and the second vision sensor 430. An outline of an object input to the first vision sensor 410 may be shown as 401 and an outline of an object input to the second vision sensor 430 may be shown as 403 of FIG. 4.

The calculation unit 470 may calculate disparity of spatial information obtained by the first vision sensor 410 and the second vision sensor 430 using information obtained by the obtain unit 450, for example, output values of the first vision sensor 410 and the second vision sensor 430.

The extract unit 490 may extract the 3D spatial information using the disparity of the spatial information calculated by the calculation unit 470. Depending on non-exhaustive examples, the 3D spatial information may be extracted by calculating and using the disparity of the spatial information recognized by at least three vision sensors.

Figure 5:
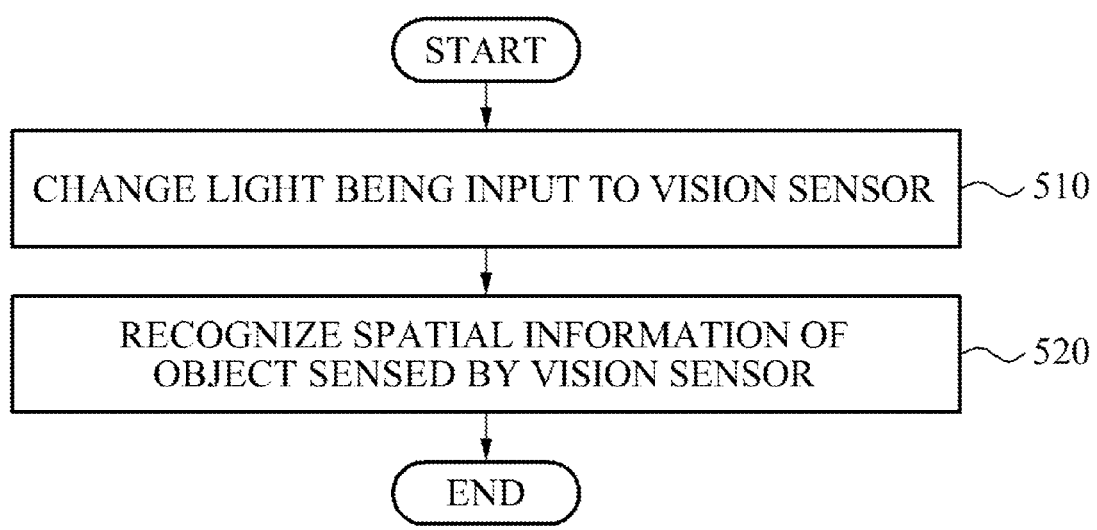
FIG. 5 is a diagram illustrating an example of a method of sensing spatial information based on a vision sensor.

FIG. 5 illustrates an example of a method of sensing spatial information based on a vision sensor. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently.

Referring to FIG. 5, in 510, a sensing apparatus may change light being input to the vision sensor that senses a temporal change of the light. In 510, the sensing apparatus may change the light using an actuator that applies a movement to the vision sensor or change transmittance of the light using a shutter. The shutter may generate an output proportional to brightness of the light. The sensing apparatus may adjust a transmittance change of the light being input to the vision sensor using the shutter.

The sensing apparatus may adjust the output of the vision sensor by adjusting a degree of the movement of the actuator. When the movement is generated at the vision sensor by the actuator, the sensing apparatus may calculate a spatial differential value of light generated from the object by the movement. The sensing apparatus may change transmittance according to a wavelength band of the light being input to the vision sensor by sequentially operating the shutter with respect to at least one color filter, and combining the sequential change results. As a result, the sensing apparatus may obtain a color image. The at least one color filter may change the transmittance according to the wavelength band of the light. The sensing apparatus may synchronize a time point at which the light is transmitted through the vision sensor with the output of the vision sensor. In addition, the sensing apparatus may adjust at least one of a minimum value, a maximum value, and a maintaining time of the transmittance, and a change period and change speed of the light, using the shutter.

In 520, the sensing apparatus may recognize the spatial information of the object sensed by the vision sensor. Depending on non-exhaustive examples, the sensing apparatus may alternately sense information on a change of the light being input to the vision sensor and the spatial information by controlling operation of the actuator or the shutter.

FIG. 6 illustrates another example of a method of sensing spatial information based on a vision sensor. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently.

Referring to FIG. 6, in 610, a sensing apparatus according to another non-exhaustive example may change light being input to the vision sensor using a shutter that adjusts transmittance of the light.

In 620, the sensing apparatus may determine whether a movement is generated at the vision sensor using an inertia sensor such as a gyro sensor.

When it is determined in 620 that movement is not generated at the vision sensor, in 650, the sensing apparatus may to recognize spatial information without compensation.

When it is determined in 620 that movement of a predetermined degree or more is generated, in 630, the sensing apparatus may calculate an optical flow generated in at least a part of a screen due to the movement using a signal obtained by the inertia sensor.

In 640, the sensing apparatus may compensate the signal obtained by the vision sensor using the calculation result of 630.

In 650, the sensing apparatus may recognize the spatial information of the object sensed by the vision sensor by reflecting the compensation result of 640.

Depending on the non-exhaustive examples, the sensing apparatus may change at least one movement information of a position, a direction, and a zoom state of the vision sensor, calculate a signal generated by the movement of the vision sensor using the changed movement information, and compensate the signal obtained by the vision sensor using the calculation result.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for sensing spatial information of a scene, the apparatus comprising:
   a dynamic vision sensor configured to sense temporal changes of light from the scene; and
   a light input controller device comprising a shutter configured to adjust a transmittance of light input to the dynamic vision sensor,
   wherein at a first time, the shutter is adjusted to a first transmittance, and change information on temporally changing objects in the scene is sensed by the dynamic vision sensor,
   wherein at a second time, the shutter is adjusted to a second transmittance, and the spatial information of the entire scene is sensed by the dynamic vision sensor, and
   wherein the first transmittance is different from the second transmittance.

2. The apparatus of claim 1, wherein the light input controller device further comprises an actuator configured to apply a movement to the dynamic vision sensor.

3. The apparatus of claim 2, wherein the light input controller device is configured to adjust an output of the dynamic vision sensor by adjusting a movement of the actuator.

4. The apparatus of claim 2, wherein the dynamic vision sensor senses a spatial differential of light generated from the object by a movement generated at the dynamic vision sensor when the movement is generated by the actuator.

5. The apparatus of claim 2, wherein the apparatus performs the sensing of the change information on the temporally changing objects in the scene and the sensing of the spatial information of the entire scene by controlling operation of the actuator or the shutter.

6. The apparatus of claim 1, wherein the shutter is configured to adjust a transmittance of the light input to the dynamic vision sensor by generating an output proportional to an observed brightness of the light input to the dynamic vision sensor.

7. The apparatus of claim 6, further comprising:
   at least one color filter configured to change transmittance according to a wavelength band of the light input to the dynamic vision sensor,
   wherein a color image is obtained by sequentially combining operational results of the shutter with respect to the at least one color filter.

8. The apparatus of claim 1, further comprising:
   a second vision sensor configured to sense a temporal change of the light from the object; and
   a second light input controller device configured to change light input to the second vision sensor.

9. The apparatus of claim 8, further comprising:
   one or more processing devices configured to obtain output values from the dynamic vision sensor and the second vision sensor, to calculate disparity of spatial information recognized from the dynamic vision sensor and the second vision sensor, and to extract 3-dimensional (3D) spatial information using the disparity of the spatial information.

10. The apparatus of claim 1, wherein the light input controller device is configured to change the light input to the dynamic vision sensor by adjusting at least one of a minimum value of transmittance, a maximum value of transmittance, a maintaining time of transmittance, a change period of the light input to the dynamic vision sensor, or a change speed of the light input to the dynamic vision sensor.

11. The apparatus of claim 1, wherein the spatial information comprises at least one of a position, a distance, a shape, a size, a color of the object, or a background of a corresponding space that includes the object.

12. The apparatus of claim 1, further comprising one or more processing devices configured to extract the spatial information, including distance of the object from the apparatus.

13. The apparatus of claim 1, further comprising one or more processing devices configured to sense movement of the object from the sensed temporal change of light from the object.

14. A method of sensing spatial information of a scene, the method comprising:
   at a first time, adjusting a shutter to input a first transmittance of light to a dynamic vision sensor and thereby sensing change information on temporally changing objects in the scene; and
   at a second time, adjusting the shutter to input a second transmittance of light to the dynamic vision sensor and thereby sensing spatial information of the entire scene,
   wherein the first transmittance is different from the second transmittance.

15. The method of claim 14, wherein the difference in transmittance of light input to the dynamic vision sensor is effected by using an actuator that is configured to apply a movement to the dynamic vision sensor.

16. The method of claim 15, wherein the difference in transmittance of light input to the dynamic vision sensor is effected by adjusting an output of the dynamic vision sensor by adjusting a degree of the movement of the actuator.

17. The method of claim 15, wherein the difference in transmittance of light input to the dynamic vision sensor is effected by sensing a spatial differential of light generated from the object due to a movement generated by the actuator at the dynamic vision sensor.

18. The method of claim 14, wherein the shutter is configured to generate an output proportional to an observed brightness of the light input to the dynamic vision sensor.

19. The method of claim 18, further comprising:
applying at least one color filter, changing a transmittance of light according to a wavelength band, to the light input to the dynamic vision sensor; and
obtaining a color image by sequentially combining operational results of the shutter with respect to the at least one color filter.

20. The method of claim 14, further comprising:
sensing a temporal change of light from the objects in the scene using a second vision sensor; and
changing light input to the second vision sensor.

21. The method of claim 20, further comprising:
calculating disparity of spatial information recognized from the dynamic vision sensor and the second vision sensor based on output values from the dynamic vision sensor for the changed light input to the dynamic vision sensor and output values from the second vision sensor for the changed light input to the second vision sensor; and
extracting 3-dimensional (3D) spatial information using the disparity of the spatial information.

22. A non-transitory computer-readable recording medium storing a program causing a computer to execute the method of claim 14.

23. An apparatus for sensing spatial information of a scene, the apparatus comprising:
a vision sensor configured to sense temporal changes of light from the scene, but not configured to sense static light from the scene; and
a light input controller device comprising a shutter configured to adjust a transmittance of light input to the vision sensor,
wherein at a first time, the shutter is adjusted to a first transmittance, and change information on temporally changing objects in the scene is sensed by the vision sensor,
wherein at a second time, the shutter is adjusted to a second transmittance, and the spatial information of the entire scene is sensed by the vision sensor, and
wherein the first transmittance is different from the second transmittance.

24. A method of sensing spatial information of a scene with a vision sensor configured to sense temporal changes of light from the scene, but not configured to sense static light from the scene, the method comprising:
at a first time, adjusting a shutter to input a first transmittance of light to the vision sensor to sense change information on temporally changing objects in the scene; and
at a second time, adjusting the shutter to input a second transmittance of light to the vision sensor to sense spatial information of the entire scene,
wherein the first transmittance is different from the second transmittance.

* * * * *